(12) United States Patent
Fukui et al.

(10) Patent No.: US 7,724,241 B2
(45) Date of Patent: May 25, 2010

(54) TOUCH PANEL

(75) Inventors: Toshiharu Fukui, Nara (JP); Nobuhiro Yamaue, Osaka (JP); Kenichi Takabatake, Osaka (JP)

(73) Assignee: Panasonic Corporation, Osaka (JP)

( * ) Notice: Subject to any disclaimer, the term of this patent is extended or adjusted under 35 U.S.C. 154(b) by 993 days.

(21) Appl. No.: 11/133,270

(22) Filed: May 20, 2005

(65) Prior Publication Data
US 2006/0017707 A1    Jan. 26, 2006

(30) Foreign Application Priority Data
Jul. 21, 2004    (JP) ............... 2004-212719

(51) Int. Cl.
*G09G 5/00* (2006.01)
(52) U.S. Cl. ............... 345/173; 345/174; 345/175; 345/176; 345/177; 345/178
(58) Field of Classification Search .......... 345/173–178
See application file for complete search history.

(56) References Cited

U.S. PATENT DOCUMENTS

| | | | |
|---|---|---|---|
| 6,472,012 B2 * | 10/2002 | Nakada et al. ........... | 427/58 |
| 6,590,622 B1 | 7/2003 | Nakanishi et al. | |
| 6,727,566 B1 | 4/2004 | Fukui et al. | |
| 6,781,642 B2 | 8/2004 | Nakanishi et al. | |
| 7,151,532 B2 * | 12/2006 | Schulz ................. | 345/173 |
| 2004/0265602 A1 * | 12/2004 | Kobayashi et al. ....... | 428/458 |

FOREIGN PATENT DOCUMENTS

| | | |
|---|---|---|
| JP | 2000-207128 | 7/2000 |
| WO | 02/29830 | 4/2002 |

OTHER PUBLICATIONS

Japanese Office Action (along with English translation) issued Oct. 6, 2009 in Application No. 2004-212719.

* cited by examiner

*Primary Examiner*—Richard Hjerpe
*Assistant Examiner*—Leonid Shapiro
(74) *Attorney, Agent, or Firm*—Wenderoth, Lind & Ponack, L.L.P.

(57) ABSTRACT

The invention relates to touch panels for use in a variety of electronic apparatuses, and designed to prevent separation of a lower substrate and an antireflection layer, and to ensure reliable operation. An undercoat layer (9) made of any of silicon oxide and a compound having a principal ingredient of silicon oxide is disposed between the antireflection layer (5) and the lower substrate (2) made of glass having the same principal ingredient of silicon oxide, to improve strength of adhesion between the lower substrate (2) and the antireflection layer (5), thereby preventing separation of the antireflection layer (5) from the lower substrate (5), and providing the touch panel with reliable operation.

4 Claims, 2 Drawing Sheets

PRIOR ART

TOUCH PANEL

FIELD OF THE INVENTION

The present invention relates to touch panels used for operating a variety of electronic apparatuses.

BACKGROUND ART

There has been significant progress in recent years in performance and diversification of various electronic apparatuses such as mobile phones and portable terminals. These apparatuses use optically transparent touch panels in a manner that they are mounted to front faces of display devices such as liquid crystal displays. When making selection of any of functions of an electronic apparatus, a user operates the touch panel by pressing it with a finger, a pen or the like while visually checking a screen of the display device disposed to the backside of this see-through touch panel. There is therefore a demand for electronic apparatuses having easy-to-see screens of display devices behind touch panels, in addition to good operability.

The accompanying figures show touch panels illustrated in a scale enlarged only in the dimension of thickness to make their structures readily understandable.

FIG. 3 is a sectional view of a touch panel of the prior art. Touch panel 10 comprises a film-like transparent upper substrate 1, and transparent lower substrate 2 made of a pane of glass or the like material. Upper substrate 1 has transparent upper conductive layer 3 of indium-tin oxide or the like material formed on main surface 1a, and lower substrate 2 has lower conductive layer 4 formed on its main surface 2a through antireflection layer 5.

Antireflection layer 5 is thus disposed between lower conductive layer 4 and lower substrate 2. Antireflection layer 5 comprises low-refraction layer 5A made of silicon oxide, magnesium fluoride or the like material having a smaller refractive index than that of lower conductive layer 4, and high-refraction layer 5B made of niobium oxide, titanium oxide or the like material having nearly same refractive index as lower conductive layer 4.

Lower conductive layer 4 has a plurality of dot spacers (not shown in the figure) formed of an insulation resin at regular intervals on one of the main surfaces facing spacer 6. Upper conductive layer 3 is provided with a pair of upper electrodes (not shown) formed at two side ends thereof, and lower conductive layer 4 is also provided with a pair of lower electrodes (not shown) at two side ends thereof in a direction orthogonal to the upper electrodes.

Spacer 6 has a frame-like shape, and it bonds between upper substrate 1 and lower substrate 2 along their peripheries with adhesive layers (not shown) formed on both of its upper and lower surfaces. In touch panel 10 of this kind, upper conductive layer 3 and lower conductive layer 4 are arranged in a manner to face each other with a predetermined space.

Touch panel 10 constructed as above is placed on a front face of a liquid crystal display or the like device and mounted to an electronic apparatus of any kind. The pairs of not-illustrated upper and lower electrodes are then connected to an electronic circuit (not shown) employed in the electronic apparatus of such kind.

In this touch panel 10, when a user presses main surface 1b of upper substrate 1 with a finger, a pen or the like while visually checking a screen of the liquid crystal display or the like device behind the touch panel, upper substrate 1 bends in a manner that upper conductive layer 3 at the pressed portion comes into contact with lower conductive layer 4.

A voltage is then impressed from the not-illustrated electronic circuit to the upper electrodes and the lower electrodes in a consecutive manner, so that the electronic circuit detects the portion being pressed according to a voltage ratio between these electrodes, and switches a variety of functions provided in the electronic apparatus.

When touch panel 10 is used in a bright environment, especially outdoors or under fluorescent lamps, the external light such as sunlight and lamplight passing through upper substrate 1 and upper conductive layer 3 is reflected in lower conductive layer 4 provided on main surface 2a of lower substrate 2, and this gives rise to a problem of making the screen in the liquid crystal display device difficult to see since it is located behind the touch panel. Antireflection layer 5 is therefore placed between lower conductive layer 4 and lower substrate 2 for the purpose of preventing reflection of the external light.

In other words, touch panel 10 of the prior art comprises low-refraction layer 5A of a comparatively small refractive index and high-refraction layer 5B of a comparatively large refractive index, both of which are laminated on main surface 4b of lower conductive layer 4 of generally the same refractive index as high-refraction layer 5B. Because of this structure, the external light hitting upon main surface 4a of lower conductive layer 4 is allowed to pass easily through the interior of lower conductive layer 4, low-refraction layer 5A, and high-refraction layer 5B. Since this results in a reduction of the external light reflected in main surface 4a of lower conductive layer 4 by the amount allowed to pass therethrough, the structure here provides the user with an easy-to-see screen of the liquid crystal display device behind touch panel 10 by virtue of this reduction of the reflected external light.

One example of the prior art techniques relevant to the present invention is illustrated in International Publication, No. 02/029830.

In the conventional touch panel 10 described above, however, high-refraction layer 5B and low-refraction layer 5A are laminated to form antireflection layer 5 on main surface 2a of lower substrate 2 made of glass or the like material. High-refraction layer 5B formed of niobium oxide, titanium oxide or the like has weak adhesion to lower substrate 2 of the glass, which leaves a problem that antireflection layer 5 is liable to separate from lower substrate 2 if touch panel 10 is warped due to an excessive force applied to it during manufacturing, transporting or mounting to an electronic apparatus.

The present invention is contrived to overcome the above problem of the prior art technique, and to provide a touch panel having a simple structure and easy to operate while preventing separation of the antireflection layer from the lower substrate.

SUMMARY OF THE INVENTION

A touch panel of this invention is provided with an undercoat layer made of any of silicon oxide and a compound having a principal ingredient of silicon oxide between an antireflection layer and a lower substrate. This undercoat layer having the principal ingredient of silicon oxide is placed on the lower substrate made of a pane of glass also having the same principal ingredient of silicon oxide. This structure improves adhesion between the lower substrate and the antireflection layer, and prevents separation of the antireflection layer from the lower substrate. The invention can thus provide the touch panel which operates reliably.

In the touch panel of this invention, the undercoat layer is formed into a thickness of 5 to 30 nm. This invention of forming the undercoat layer of a comparatively small thickness allows use of a material having a small refractive index such as a glass for the lower substrate located under the undercoat layer. The undercoat layer can also prevent the external light from being reflected in the main surface of the lower substrate, thereby helping a user to visually check a screen of a liquid crystal display device behind the touch panel, and to promptly and positively confirm a situation and state shown in the screen.

In another touch panel of this invention, the antireflection layer is formed of a plurality of layers, each having a different refractive index. The antireflection layer comprising two layers, three layers, or even four layers lets the external light pass therethrough more easily, and further reduces the reflection, thereby helping the user to visually check more easily the screen of the liquid crystal display device on its behind.

Furthermore, another touch panel of this invention comprises additional antireflection layer formed on another surface of the lower substrate opposite the surface where the original antireflection layer is provided. The additional antireflection layer can prevent the external light from being reflected in the back surface of the lower substrate, and further help the user to check the screen on the behind more easily.

According to the present invention as described above, there is provided an advantageous effect of achieving the touch panel which can prevent separation of the antireflection layer from the lower substrate, and ensure reliable operation.

DETAILED DESCRIPTION OF THE INVENTION

Description is provided hereinafter of exemplary embodiments of the present invention with reference to FIG. 1 and FIG. 2.

These figures show touch panels in a scale enlarged only in the dimension of thickness to make their structures readily understandable. In addition, like reference marks are used throughout to designate components of the like structures as those of the prior art panel, and their descriptions are abridged.

First Embodiment

Figure 1:
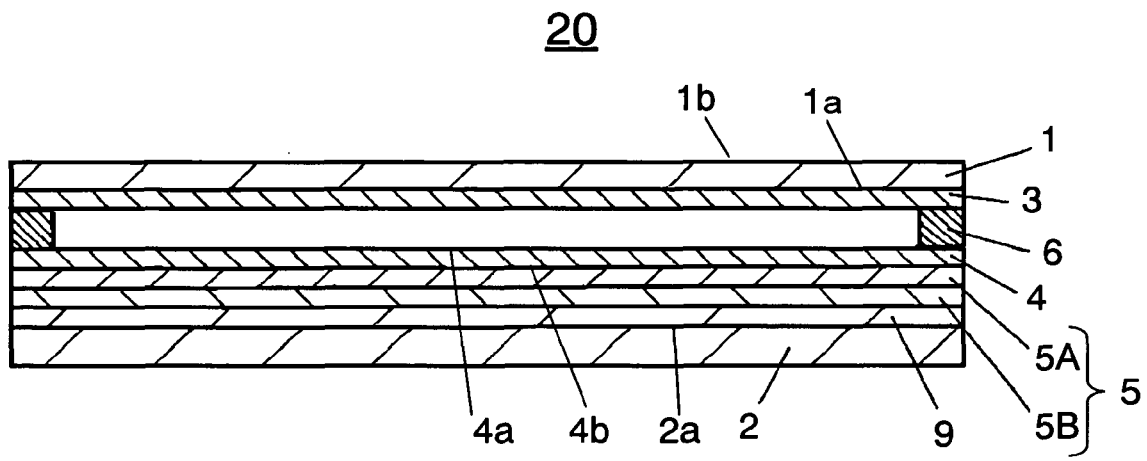
FIG. 1 is a sectional view of a touch panel according to an exemplary embodiment of the present invention.

FIG. 1 shows a sectional view of touch panel 20 according to the first embodiment of the present invention. It comprises film-like upper substrate 1 having optical transparency made of a material such as one selected among polyethylene terephthalate, polyether sulfone, polycarbonate, norbornane and the like resins, and transparent lower substrate 2 such as a pane of glass and acrylic resin. Upper substrate 1 has transparent upper conductive layer 3 formed of any of indium-tin oxide, tin oxide, and the like materials in a thickness of 30 to 35 nm on its main surface 1a, and lower substrate 2 has lower conductive layer 4 formed on its main surface 2a through antireflection layer 5 between them. Both upper conductive layer 3 and lower conductive layer 4 are formed by means of sputtering or the like method.

Antireflection layer 5 is thus disposed between lower conductive layer 4 and lower substrate 2, and it has a thickness of 120 to 160 nm. Antireflection layer 5 is formed of a laminated structure comprising low-refraction layer 5A made of silicon oxide, magnesium fluoride or the like material having a smaller refractive index than that of lower conductive layer 4, and high-refraction layer 5B made of niobium oxide, titanium oxide, zirconium oxide, indium-tin oxide or the like material having nearly same refractive index as lower conductive layer 4.

Undercoat layer 9 is made of any of silicon oxide and a compound having a principal ingredient of silicon oxide, and it is formed in a thickness of 5 to 30 nm between antireflection layer 5 and lower substrate 2 by means of sputtering or the like method.

Lower conductive layer 4 has a plurality of dot spacers (not shown) formed of an insulation resin such as epoxy and silicon at regular intervals on its main surface 4a. Upper conductive layer 3 is provided with a pair of upper electrodes (not shown) formed at two side ends thereof, and lower conductive layer 4 is also provided with a pair of lower electrodes (not shown) at two side ends thereof in a direction orthogonal to the pair of upper electrodes.

Touch panel 20 is provided with frame-like spacer 6 formed of a unwoven cloth or a polyester film, and this spacer 6 bonds between upper substrate 1 and lower substrate 2 along their peripheries with adhesive layers (not shown) formed on both of its upper and lower surfaces. Touch panel 20 is thus constructed of upper conductive layer 3 and lower conductive layer 4 in a manner that they face each other with a predetermined space.

Touch panel 20 constructed as above is disposed to a front face of a liquid crystal display or the like device and mounted to an electronic apparatus of any kind. The pairs of not-illustrated upper and lower electrodes are then connected to an electronic circuit (not shown) of the apparatus.

When a user presses main surface 1b of upper substrate 1 with a finger, a pen or the like while visually checking a screen of the liquid crystal display or the like device behind the touch panel 20 constructed as described above, upper substrate 1 bends in a manner that upper conductive layer 3 at the pressed portion comes into contact with lower conductive layer 4.

A voltage is then impressed from the not-illustrated electronic circuit to the upper electrodes and the lower electrodes in a consecutive manner, so that the electronic circuit detects the portion being pressed according to a voltage ratio between these electrodes, and switches a variety of functions provided in the electronic apparatus.

When this kind of electronic apparatus equipped with touch panel 20 is used in a bright environment, especially outdoors or under fluorescent lamps, the external light such as sunlight and lamplight passing through upper substrate 1 and upper conductive layer 3 is reflected in lower conductive layer 4 provided on main surface 2a of lower substrate 2, and this tends to make the screen in the liquid crystal display device difficult to see as it is located behind the touch panel. However, antireflection layer 5 disposed between lower conductive layer 4 and lower substrate 2 is designed to prevent the external light from being reflected.

In other words, the external light hitting upon main surface 4a of lower conductive layer 4 is allowed to pass easily through lower conductive layer 4, low-refraction layer 5A and high-refraction layer 5B, since the touch panel of this invention comprises low-refraction layer 5A of a comparatively small refractive index ranging between approx. 1.4 and 1.5 and high-refraction layer 5B of a comparatively large refractive index ranging between 1.8 and 1.9, both of which are laminated on main surface 4b of lower conductive layer 4 of generally the same refractive index as high-refraction layer 5B. This results in a reduction of the external light reflected in main surface 4a of lower conductive layer 4 by the amount allowed to pass therethrough. Accordingly, this structure provides the user with an easy-to-see screen of the liquid crystal display and the like device behind touch panel 20 by virtue of the reduction of the reflected external light.

This antireflection layer 5 is formed on main surface 2a of lower substrate 2 made of a glass or the like having a principal ingredient of silicon oxide through interposed undercoat layer 9 having the same principal ingredient of silicon oxide. This improves adhesion between lower substrate 2 and antireflection layer 5, and prevents separation of antireflection layer 5 from lower substrate 2 even if touch panel 20 is warped due to an excessive force applied to it during manufacturing, transporting or mounting to an electronic apparatus.

If undercoat layer 9 is too thin, the adhesion of antireflection layer 5 to lower substrate 2 decreases. If undercoat layer 9 is too thick, on the other hand, reflection of the external light tends to increase in the interface of undercoat layer 9 and lower substrate 2 located under it, since the refractive index of undercoat layer 9 having the principal ingredient of silicon oxide is 1.4 to 1.5, which is slightly smaller than the refractive index 1.5 of lower substrate 2 made of glass or the like.

Undercoat layer 9 is therefore formed into a thickness of 5 to 30 nm, and more preferably between 15 and 20 nm, in order to maintain the close adhesion between lower substrate 2 and antireflection layer 5 as well as the transparency by preventing reflection of the external light.

According to the first exemplary embodiment, there is provided undercoat layer 9 made of any of silicon oxide and a compound having the principal ingredient of silicon oxide between antireflection layer 5 and lower substrate 2 of the glass having the same principal ingredient of silicon oxide. This structure increases a strength of the adhesion between lower substrate 2 and antireflection layer 5, so as to prevent separation of antireflection layer 5 from lower substrate 2, thereby providing the touch panel which operates reliably.

In addition, undercoat layer 9 can retain the close adhesion between lower substrate 2 and antireflection layer 5 when it is kept between 5 and 30 nm in thickness, and more preferably between 15 and 20 nm, and it also prevents the external light from being reflected in the upper surface of lower substrate 2, thereby making the screen of the liquid crystal display device in the behind easy to see even though lower substrate 2 is made of the material of small refractive index such as glass.

Furthermore, undercoat layer 9 formed between antireflection layer 5 and lower substrate 2 causes main surface 4a of lower conductive layer 4 to become 0.7 to 2 nm in Ra value of surface roughness. This surface roughness is larger than 0.4 to 0.5 nm, the values when not provided with undercoat layer 9. This surface roughness can hence prevent a problem that upper conductive layer 3 sticks to lower conductive layer 4 when pressed during operation. Moreover, this invention improves durability of the touch panel since upper conductive layer 3 and lower conductive layer 4 come into contact with each other at plural points rather than in surfaces, which lessens their friction.

Second Embodiment

Figure 2:
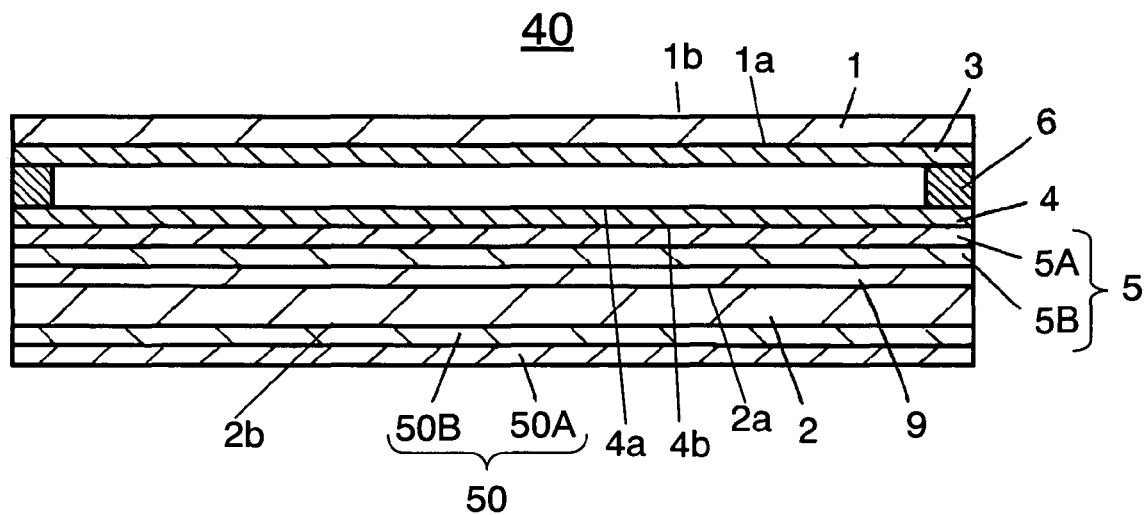
FIG. 2 is a sectional view of a touch panel according to another exemplary embodiments.
Figure 3:
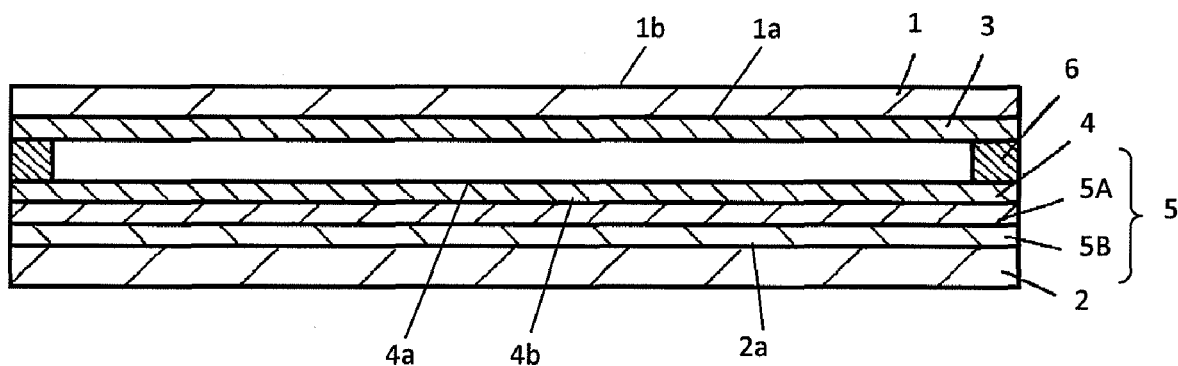
FIG. 3 is a sectional view of a touch panel of the prior art.

FIG. 2 is a sectional view of touch panel 40 according to the second embodiment of this invention. Like reference marks are used throughout to designate like components as those of FIG. 1 discussed in the first embodiment. A structure of touch panel 40 according to the second embodiment will be described briefly as follows, although some parts of the first embodiment may be repeated.

Touch panel 40 comprises upper substrate 1 and lower substrate 2. Upper substrate 1 has upper conductive layer 3 formed on its main surface 1a, and lower substrate 2 has lower conductive layer 4 formed on its main surface 2a. Another main surface 1b of upper substrate 1 serves as an operating area to be pressed with a finger, pen and the like. Antireflection layer 5 comprises low-refraction layer 5A and high-refraction layer 5B, and it is disposed between another main surface 4b of lower conductive layer 4 and lower substrate 2.

Spacer 6 is disposed between upper conductive layer 3 and main surface 4a of lower conductive layer 4 in a manner that upper conductive layer 3 and lower conductive layer 4 face each other with a predetermined space. Undercoat layer 9 is provided between antireflection layer 5 and lower substrate 2.

In addition, high-refraction layer 50B and low-refraction layer 50A are laminated on the other main surface 2b of lower substrate 2 to form another antireflection layer 50, as a distinctive feature of the second exemplary embodiment, as shown in FIG. 2. Antireflection layer 50 adopted here may be of the same structure as antireflection layer 5. The structure discussed here can prevent reflection of the external light entering from both of upper substrate 1 and lower substrate 2, help make the display located behind more easily viewable.

Furthermore, each of antireflection layers 5 and 50 may be formed of a plurality of layers such as two layers, three layers, or even four layers of different refractive indexes, so that they help the external light to pass through even more easily and to reduce the reflection, thereby making the liquid crystal display device located behind more easily viewable.

INDUSTRIAL APPLICABILITY

Touch panels of the present invention have a structure to prevent separation of a lower substrate and an antireflection layer, and ensure reliable operation. Since these touch panels are useful for operating electronic apparatuses of various kinds, their industrial applicability is outstanding.

What is claimed is:

1. A touch panel comprising:
an upper substrate having an upper conductive layer formed on one of main surfaces of the upper substrate,
a lower substrate having a lower conductive layer formed on one of main surfaces of the lower substrate in a manner to face the upper conductive layer with a predetermined space, the lower substrate being glass having silicon oxide as a main principal ingredient;
an antireflection layer formed between the lower conductive layer and the lower substrate; and
an undercoat layer, made of any of silicon oxide and a compound having silicon oxide as a principal ingredient, disposed between the antireflection layer and the lower substrate,
wherein the undercoat layer directly contacts both the antireflection layer and the lower substrate so as to enhance bonding strength between the antireflection layer and the lower substrate,
wherein surface roughness of a main surface of the lower conductive layer has an Ra value of 0.7 nm to 2 nm, and
wherein the undercoat layer has a thickness of 5 to 30 nm.

2. The touch panel according to claim 1, wherein the undercoat layer has a thickness of 15 to 20 nm.

3. The touch panel according to claim 1, wherein the antireflection layer comprises a plurality of layers, each having a different refractive index.

4. The touch panel according to claim 1 further comprising another antireflection layer disposed on another main surface of the lower substrate opposite the surface where the antireflection layer and the undercoat layer are formed.

* * * * *